United States Patent [19]

Kuhlmann

[11] Patent Number: 5,565,719
[45] Date of Patent: Oct. 15, 1996

[54] HAND POWER TOOL

[75] Inventor: Gerhard Kuhlmann, Stuttgart, Germany

[73] Assignee: Robert Bosch GmbH, Stuttgart, Germany

[21] Appl. No.: 281,839

[22] Filed: Jul. 28, 1994

Related U.S. Application Data

[63] Continuation of Ser. No. 97,076, Jul. 23, 1993, abandoned.

[30] Foreign Application Priority Data

Aug. 14, 1992 [DE] Germany .................. 42 26 903.2

[51] Int. Cl.$^6$ .......................... H02K 5/04; H02K 7/14
[52] U.S. Cl. .................................. 310/47; 310/89
[58] Field of Search ........................... 310/42, 47, 50,
310/89; 411/41, 60, 338, 339, 508, 509,
510; 403/289, 290, 297, 298, 313, 408.1

[56] References Cited

U.S. PATENT DOCUMENTS

| | | | |
|---|---|---|---|
| 3,099,895 | 8/1963 | Beebe | 403/289 |
| 3,313,964 | 4/1967 | Mattson et al. | 310/47 |
| 3,536,943 | 10/1970 | Bowen, III et al. | 310/50 |
| 3,908,139 | 9/1975 | Duncan, Jr. | 310/50 |
| 4,081,704 | 3/1978 | Vassos et al. | 310/50 |
| 4,276,806 | 7/1981 | Morel | 411/41 |
| 4,349,758 | 9/1982 | Grant, Jr. et al. | 310/50 |
| 4,391,559 | 7/1983 | Mizusawa | 411/45 |
| 4,772,765 | 9/1988 | Markle et al. | 310/50 |
| 5,089,729 | 2/1992 | Moores, Jr. | 310/50 |
| 5,143,500 | 9/1992 | Schuring et al. | 411/339 |
| 5,192,097 | 3/1993 | Su | 411/41 |
| 5,226,769 | 7/1993 | Negre et al. | 411/354 |

FOREIGN PATENT DOCUMENTS 2171447  8/1986  United Kingdom .

*Primary Examiner*—Clayton E. LaBalle
*Attorney, Agent, or Firm*—Michael J. Striker

[57] ABSTRACT

A hand power tool has a housing composed of at least two parts, and a plurality of connecting elements which connect the housing parts with one another at a plurality of mounting points. The housing parts are provided with a pair of tubular domes arranged at each of the mounting points and having associated passages which are arranged coaxially with one another and are formed as throughgoing passages at both sides. The connecting elements are formed by pins each extending through the passages of each of the pairs of the domes.

13 Claims, 3 Drawing Sheets

HAND POWER TOOL

This is a continuation of application Ser. No. 097 076 filed Jul. 23, 1993, abandoned.

BACKGROUND OF THE INVENTION

The present invention relates to a hand power tool, preferably an electrically driven hand power tool.

More particularly, it relates to a hand power tool which has a housing composed of two parts which are releasably connected with one another at a plurality of mounting points by insertable connecting means.

Power tools of the above mentioned general type with housing shells composed of synthetic plastic material and connected with one another by metal screws are known in the art. The screws are located usually in opposite depressions or projections of the housing, which are provided on the one hand with a throughgoing opening and on the other hand with a blind hole.

The above described known connection has several disadvantages. The mounting of the housing requires a relatively long time for screwing as well as expensive automatic machines or expensive work force. The utilized screwing tools develop a substantial noise. The screwing-in by hand leads frequently to breakage of screws or cracking of screw domes. Since the screw heads are metal parts which are to be contacted from outside they must be subjected to a high voltage testing after mounting. The screw domes in the injection molded housing parts also have the disadvantage that during cooling, shrinkage points are formed due to the material accumulation. The needles which form the blind holes in the casting tools, cool poorly and therefore increase the manufacturing cycle.

SUMMARY OF THE INVENTION

Accordingly, it is an object of the present invention to provide a hand power tool, which avoids the disadvantages of the prior art.

In keeping with these objects and with others which will become apparent hereinafter, one feature of the present invention resides, briefly stated, in a hand power tool with a housing composed of at least two parts connectable in several mounting points releasably by insertable connecting means, wherein in accordance with the invention, at the mounting points of the housing parts inside tubular domes, pairs of throughgoing passages associated with one another are formed, the passages are arranged coaxially and extend from both sides through, and the connecting means are formed as solid or tubular pins insertable into the passages.

When the hand power tool is designed in accordance with the present invention, the above mentioned disadvantages are eliminated and tile highly advantageous results are obtained. The insertion of a smooth pin requires substantially less time and skills or apparatus expenses. The drawbacks of mounting practically do not occur and the high voltage testing is completely dispensed with. Furthermore, the molding of the housing shells which instead of blind holes have throughgoing openings is substantially better for the injection molding process. Moreover, the wall thicknesses of the dome are reduced and therefore the space requirements for the housing connection becomes lower.

In accordance with another especially advantageous feature of the present invention, a small undercut of the the domes which are inserted in one another is provided, so that a form-locking connection is obtained. A small upsetting of the pin ends makes difficult the opening of the device by unauthorized persons.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
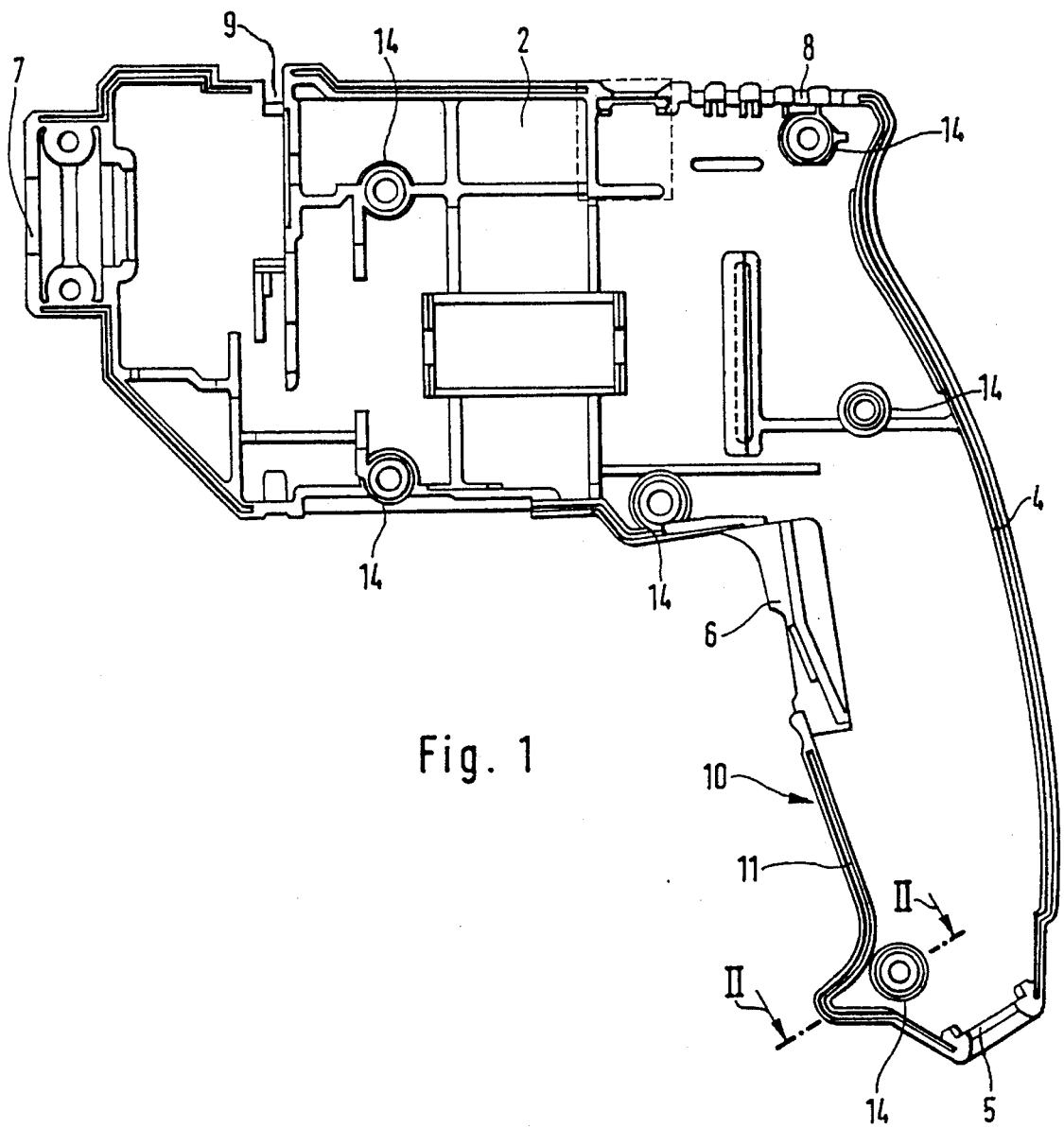
FIG. 1 is a view showing an interior of a housing shell of a hand power tool in accordance with the present invention.
Figure 2:
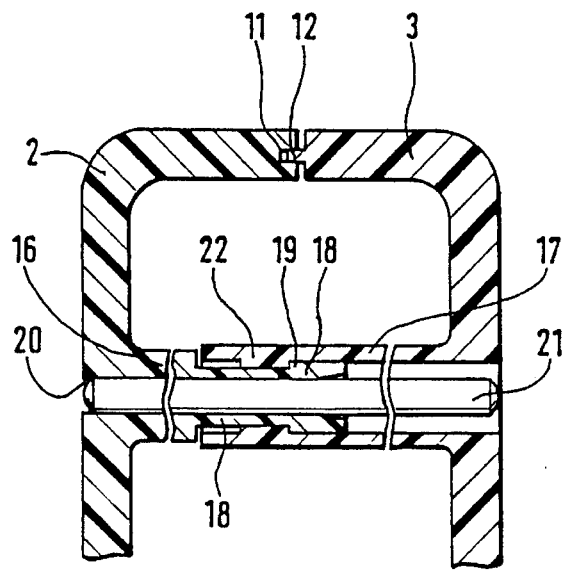
FIG. 2 is a view showing a section taken along the line II—II in FIG. 1.

A housing of a hand power tool, for example a hammer drill, is shown in FIG. 1. The housing is composed of two ribbed housing parts 2 and 3 which are formed as shells. FIG. 1 shows a right housing half when seen from a handle 3. The housing shell 2 has a recess 5 for inserting an electrical supply cable and a recess 6 for inserting a switch. It is further provided with an opening 7 through which the drill spindle extends outwardly. Finally, the housing has air inlet openings 8 and air outlet openings 9. A circumferential, flat edge 10 of the housing shell 2 which extends in the region of the openings has also a circumferential groove 11 in which a projection 12 of the second housing part 3 engages as can be seen in FIG. 2. Both housing parts 2 and 3 are substantially mirror-symmetrical, so that together they form a closed housing.

The housing parts 2 and 3 are connected with one another by six identically formed mounting points 14. FIG. 2 shows as an example a section of the mounting point located at the gripping end. Cylindrical tubular domes 16 and 17 are formed integrally on the housing shells and arranged opposite to one another as can be seen from the drawings. The dome 16 has an end portion which is reduced and slotted so as to form two tongues 18 shown in FIGS. 3–5. The ends of the tongues 18 carry radially outwardly extending step-like projections 19. A passage 20 extends through the whole dome and has a uniform diameter. A solid pin 21 composed of a synthetic plastic material extends in the passage 20 and is reliably held in the passage 20 of the dome 16 by a sliding fit, a friction fit or pressure fit. The diameter of the pin amounts to approximately 3 mm. The pin can also be tubular as shown in FIG. 6 and identified with reference numeral 21'.

The dome 17 is completely tubular with an inner diameter approximately 5 mm which substantially corresponds to the outer diameter of the projection 19 of the dome 16. The dome 17 has a front end provided with an inwardly extending collar 22. In the mounted condition of the housing the collar 22 of the dome 17 forms a form-locking connection with the projection 19 of the dome 16.

Figures 3, 4, 5:
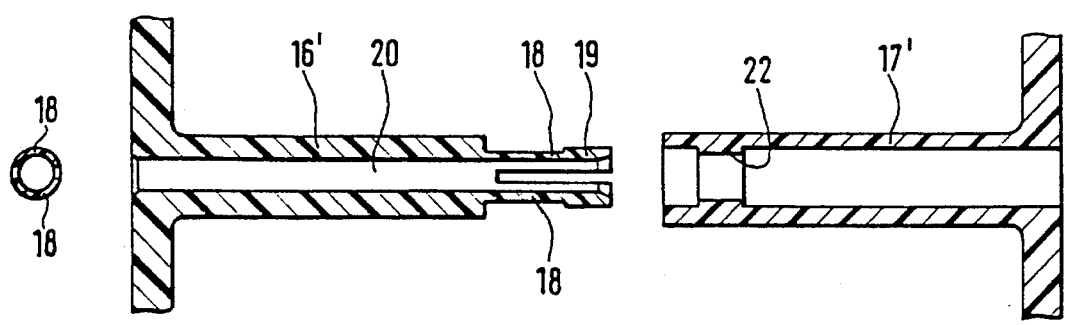
FIGS. 3, 4 and 5 are views showing connecting elements of the inventive hand power tool in detail.
Figure 6:
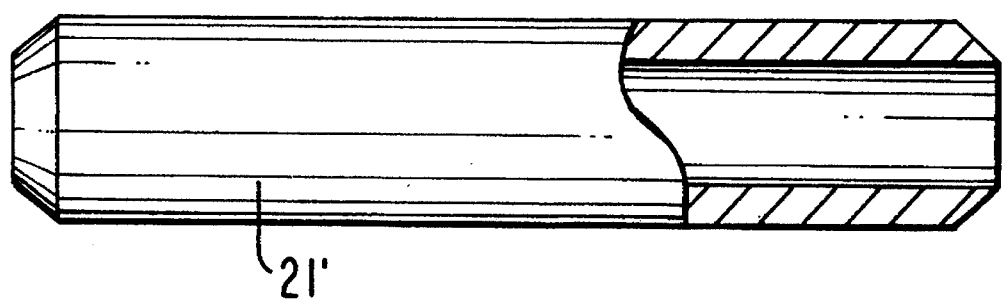
FIG. 6 is a view showing a connecting pin for housing parts of the inventive hand power tools

The domes 16' and 17' are shown in FIGS. 3, 4 and 5 in detail. They differ from the domes shown in FIG. 2 by their greater lengths. The length of the dome depends on the different thickness of the hand power tool in the region of the corresponding mounting point. It is selected so that the housing parts 2 and 3 snugly abut against one another.

The mounting of the power tool in accordance with the present invention is performed in a conventional manner. First inner structural elements such as a motor, a transmission, a switch and a cable are inserted into one shell or mounted on it. The second housing shell is then placed on the first housing shell and is pressed against it. The domes 16 are thereby introduced into the domes 17 until the projections 19 audibly engage with the collars 22. The yieldable and back-springable tongues 18 facilitate this process without loading the domes due to deformation. The snap connection of the domes leads to a completely closed housing. For preventing elastic springing back during strong loads or falling of the housing, the pins 21 which are cut to corresponding length are introduced into the passages 20. Due to their friction they sufficiently adhere in the domes 16 so that a further securing is not needed. For preventing opening by unauthorized personnel the pins at their ends can be upset so as to form thickened heads. For upsetting at the side of the dome 16 the space which is formed by the forming out incline on the passages 20 can be utilized. The pins can be secured at the ends by applying cement or the like. In the very highly loadable regions of the housing, such as for example the neck of the drill where the spindle extends outwardly of the housing, screws can still be maintained for connecting of the housing shells with one another as in known cases.

The connection of the housing halves with one another by snappable-in domes reduces the wall thickness or the outer diameter of the domes to approximately 8 mm, since when compared with a screw connection the twisting moment applied additionally to the housing material during screwing-in is dispensed with. In addition, no screw heads must be provided, whereby the outer dome 17 can have smaller dimensions. The smaller dome facilitates the arrangement of the inner structural parts of the drill and leads for example to an improved throughflow near the air inlet openings and air outlet openings.

The pins 21 have been shown as being formed as solid members. However, the pins can also be tubular. While in the drawings the domes 16 and 17 are shown as one-piece with the corresponding housing parts, it is to be understood, that the domes can be made as separate parts received in recesses of the housing parts. The pins 21 can be composed of a synthetic plastic wire.

It will be understood that each of the elements described above, or two or more together, may also find a useful application in other types of constructions differing from the types described above.

While the invention has been illustrated and described as embodied in a hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand power tool, comprising a housing composed of at least two parts; and a plurality of connecting elements which connect said housing parts with one another at a plurality of mounting points, being secured by securing means, said housing parts being provided with a pair of cylindrical tubular domes each formed integrally on a respective one of said housing parts, and arranged at each of said mounting points, said domes having associated passages which are arranged coaxially with one another and are formed as throughgoing passages at both sides, said domes of each of said pair includes an inner dome and an outer dome, said outer dome having a collar while said inner dome has a projection extending step-like radially outwardly and engaging behind said collar of said outer dome, forming a form-locking connection with said collar in the mounted condition of said housing, said securing means being formed by pins each extending through said passages of each of said pairs of said domes.

2. A hand power tool as defined in claim 1, wherein said pins of said connecting means are formed as solid pins.

3. A hand power tool as defined in claim 1, wherein said pins of said connecting means are formed as tubular pins.

4. A hand power tool as defined in claim 1, wherein said pins have an outer surface which is substantially smooth.

5. A hand power tool as defined in claim 1, wherein said domes of each of said pairs have at least end portions which have different diameters and engage with one another.

6. A hand power tool as defined in claim 1, wherein said domes are formed of one piece with a respective one of said housing parts of said housing.

7. A hand power tool as defined in claim 1, wherein said housing parts of said housing have a plurality of recesses, said domes being inserted in said recesses.

8. A hand power tool as defined in claim 1, wherein said projection is radially yieldable.

9. A hand power tool as defined in claim 1, wherein said pins are composed of a synthetic plastic material.

10. A hand power tool as defined in claim 9, wherein said pins are formed as synthetic plastic wires.

11. A hand power tool as defined in claim 1, wherein said pins have outer ends which after insertion of said pins in said passages are thickened by upsetting.

12. A hand power tool as defined in claim 1, wherein said domes are composed of a synthetic plastic material.

13. A hand power tool, comprising a housing composed of at least two parts; and a plurality of connecting elements which connect said housing parts with one another at a plurality of mounting points, being secured by securing means, one of said housing parts being provided with a circumferential groove while the other of said housing parts is provided with a projection engaging in said circumferential groove, said housing parts being also provided with a pair of cylindrical tubular domes each formed integrally on a respective one of said housing parts, and arranged at each of said mounting points, said domes having associated passages which are arranged coaxially with one another and are formed as throughgoing passages at both sides, said domes of each of said pair includes an inner dome and an outer dome, said outer dome having a collar while said inner dome has a reduced end portion which is slotted to form two tongues and also has a projection engaging behind said collar of said outer dome, forming a form-locking connection with said collar in the mounted condition of said housing, said securing means being formed by pins each extending through said passages of each of said pairs of said domes.

* * * * *